United States Patent
Park et al.

(10) Patent No.: US 9,315,095 B2
(45) Date of Patent: Apr. 19, 2016

(54) HYBRID POWER TRAIN FOR VEHICLE

(71) Applicant: Hyundai Motor Company, Seoul (KR)

(72) Inventors: Jong Yun Park, Hwaseong-si (KR); Eui Cheol Chung, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/270,953

(22) Filed: May 6, 2014

(65) Prior Publication Data

US 2015/0107407 A1     Apr. 23, 2015

(30) Foreign Application Priority Data

Oct. 18, 2013   (KR) .................. 10-2013-0124846

(51) Int. Cl.

| | |
|---|---|
| *F16H 37/06* | (2006.01) |
| *B60K 6/36* | (2007.10) |
| *B60K 6/387* | (2007.10) |
| *B60K 6/442* | (2007.10) |

(52) U.S. Cl.
CPC . *B60K 6/36* (2013.01); *B60K 6/387* (2013.01); *B60K 6/442* (2013.01); *Y10S 903/902* (2013.01); *Y10T 74/19014* (2015.01)

(58) Field of Classification Search
USPC ..................................... 74/661, 665 A, 665 B
See application file for complete search history.

(56) References Cited

U.S. PATENT DOCUMENTS

| | | | | |
|---|---|---|---|---|
| 8,506,450 B2* | 8/2013 | Nakasako | .......................... | 477/5 |
| 8,622,862 B2* | 1/2014 | Koyama et al. | .................... | 475/5 |
| 8,661,941 B2* | 3/2014 | Hellenbroich et al. | ......... | 74/661 |
| 8,696,505 B2* | 4/2014 | Lee et al. | ........................... | 475/5 |
| 8,960,033 B2* | 2/2015 | Kaltenbach et al. | ............. | 74/331 |

FOREIGN PATENT DOCUMENTS

| | | |
|---|---|---|
| JP | 10-217779 A | 8/1998 |
| JP | 2001-97058 A | 4/2001 |
| JP | 2001-287555 A | 10/2001 |
| JP | 2011-168085 A | 9/2011 |
| JP | 2012-228923 A | 11/2012 |
| KR | 10-0726733 B1 | 6/2007 |
| KR | 10-2012-0019855 A | 3/2012 |

* cited by examiner

*Primary Examiner* — Ha D Ho

(74) *Attorney, Agent, or Firm* — Morgan, Lewis & Bockius LLP

(57) ABSTRACT

A hybrid power train for a vehicle is capable of improving fuel efficiency of the vehicle by preventing a motor from being driven by power of an engine for a period in which the vehicle is driven by the engine. The hybrid power train may include an input shaft installed to selectively receive power of an engine, an engine side driving gear provided at the input shaft, an output shaft disposed in parallel with the input shaft, an engine side driven gear provided at the output shaft so as to be engaged with the engine side driving gear, a motor side driving gear installed to be rotated by a motor while forming a concentric axis with the input shaft, a motor side driven gear rotatably provided at the output shaft so as to be engaged with the motor side driving gear, and a clutch unit installed to switch a state in which the motor side driven gear is fixed to the output shaft.

7 Claims, 5 Drawing Sheets

HYBRID POWER TRAIN FOR VEHICLE

CROSS REFERENCE TO RELATED APPLICATION

The present application claims priority of Korean Patent Application Number 10-2013-0124846 filed Oct. 18, 2013, the entire contents of which application is incorporated herein for all purposes by this reference.

BACKGROUND OF INVENTION

1. Field of Invention

The present invention relates to a hybrid power train for a vehicle, and more particularly, to a technology associated with a power train for a vehicle capable of providing driving force of the vehicle by power output from an internal combustion engine, and a motor driven by electricity.

2. Description of Related Art

A hybrid power train appropriately operating power generated from an internal combustion engine, and power generated from a motor driven by electricity in harmony to drive a vehicle basically utilizes a complementary aspect between a torque feature of the engine and a torque feature of the motor to improve efficiency in driving the vehicle.

Therefore, a hybrid power train according to the related art may drive the vehicle mainly by the motor at the time of starting the vehicle or in a low speed situation to implement an EV mode using a feature of a motor having an excellent low speed torque feature, drive the vehicle by the engine having a relatively excellent torque feature in a medium speed or high speed situation, and implement a hybrid mode capable of using both of the torques of the engine and the motor in a driving situation requiring a high torque.

However, the hybrid power train according to the related art has a structure in which a rotor of the motor is rotated by power from the engine in the situation in which the vehicle is driven by the engine. However, the rotation of the motor as described above in the situation in which the vehicle is driven only by the engine acts as a drag torque, which causes deterioration of fuel efficiency of the vehicle.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a hybrid power train for a vehicle capable of improving fuel efficiency of the vehicle by preventing a motor from being driven by power of an engine for a period in which the vehicle is driven by the engine.

According to various embodiments of the present invention, there is provided a hybrid power train for a vehicle, including: an input shaft installed to selectively receive power of an engine; an engine side driving gear provided at the input shaft; an output shaft disposed in parallel with the input shaft; an engine side driven gear provided at the output shaft so as to be engaged with the engine side driving gear; a motor side driving gear installed to be rotated by a motor while forming a concentric axis with the input shaft; a motor side driven gear rotatably provided at the output shaft so as to be engaged with the motor side driving gear; and a clutch unit installed to switch a state in which the motor side driven gear is fixed to the output shaft.

The present methods and apparatuses have other features and advantages apparent from the accompanying drawings, incorporated herein, and below Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
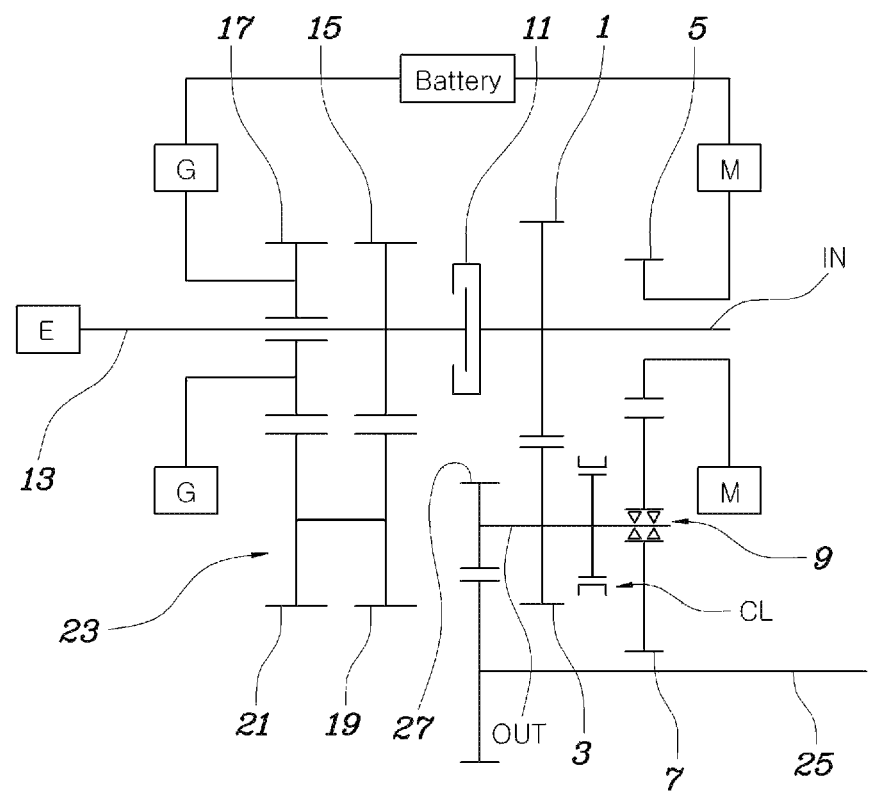
FIG. 1 is a diagram showing a configuration of an exemplary hybrid power train for a vehicle according to the present invention.

Referring to FIG. 1, a hybrid power train for a vehicle according to various embodiments of the present invention is configured to include an input shaft IN installed to selectively receive power of an engine E; an engine side driving gear 1 provided at the input shaft IN; an output shaft OUT disposed in parallel with the input shaft IN; an engine side driven gear 3 provided at the output shaft OUT so as to be engaged with the engine side driving gear 1; a motor side driving gear 5 installed to be rotated by a motor M while forming a concentric axis with the input shaft IN; a motor side driven gear 7 rotatably provided at the output shaft OUT so as to be engaged with the motor side driving gear 5; and a clutch unit CL installed to switch the state in which the motor side driven gear 7 is fixed to the output shaft OUT.

That is, the state in which the motor side driven gear 7 is fixed and connected to the output shaft OUT and the state in which the motor side driven gear 7 is released from the output shaft OUT to thereby be freely rotatable may be switched by the clutch unit CL. Therefore, the clutch unit CL is released in an engine mode in which the vehicle is driven only by the engine E to allow the motor side driven gear 7 and the motor side driving gear 5 and the motor M sequentially connected to the motor side driven gear 7 not to be rotated and allow the power transferred from the engine to the input shaft IN to be used only to drive the vehicle through the output shaft OUT, thereby making it possible to improve fuel efficiency of the vehicle.

In an EV mode in which the vehicle is to be driven by the motor M, the clutch unit CL is connected, such that driving force from the motor M may sequentially pass through the motor side driving gear 5, the motor side driven gear 7, and the output shaft OUT and be then used to drive the vehicle.

However, in various embodiments, the hybrid power train for a vehicle is configured to further include a one-way clutch 9 interposed between the motor side driven gear 7 and the output shaft OUT and allowing power to be transferred from the motor side driven gear 7 to the output shaft OUT in only one direction at the time of forward rotation.

Therefore, according to the above-mentioned configuration, the clutch unit CL is continuously maintained only in the state in which it is released in the engine mode and the EV mode, the output shaft OUT is freely rotated regardless of the motor side driven gear 7 by the one-way clutch 9 in the engine mode, such that the motor side driven gear 7, the motor side driving gear 5, and the motor M are naturally in the state in which they are not rotated as described above, and the engine E is in a stop state in the EV mode, such that when the motor M is driven in the state in which an engine clutch 11 to be described below is blocked, rotational force through the motor side driving gear 5 and the motor side driven gear 7 is transferred to the output shaft OUT through the one-way clutch 9 to drive the vehicle by rotational force of the motor.

In this case, the clutch unit CL is used to connect the motor side driven gear 7 to the output shaft OUT when backward movement of the vehicle is to be implemented by the rotational force of the motor M.

For reference, the motor side driven gear 7 and the output shaft OUT may be connected to each other by a general bearing, a needle bearing, or the like, instead of the one-way clutch 9. In this case, an operation of releasing the clutch unit CL in the engine mode and connecting the clutch unit CL in the EV mode is required.

The clutch unit CL may be formed of a dog clutch configured to switch the states in which the motor side driven gear 7 is fixed to the output shaft OUT and is released from the output shaft OUT or be formed of a synchronizing device including a synchronizer ring.

Meanwhile, the engine side driving gear 1 has a diameter larger than that of the engine side driven gear 3 and the motor side driving gear 5 has a diameter smaller than that of the motor side driven gear 7 to transfer the power of the engine to a driving wheel in an overdrive state when the vehicle is driven by the engine E, thereby allowing the engine to be mainly used at the time driving the vehicle at a high speed and decrease the power of the motor when the vehicle is driven by the motor M, thereby increasing and outputting a torque to be in charge of low speed performance of the vehicle. Therefore, torque features of the engine and the motor complementarily act, thereby making it possible to entirely improve fuel efficiency of the vehicle.

An engine clutch 11 is provided between the input shaft IN and an engine shaft 13 of the engine so as to intermit power to the input shaft IN.

In addition, the hybrid power train for a vehicle according to various embodiments of the present invention further includes a power generation driving gear 15 provided at the engine shaft 13; a power generation driven gear 17 rotatably installed while forming a concentric axis with the engine shaft 13 and connected to a generator G so as to rotate the generator G; and an idler shaft 23 disposed in parallel with the engine shaft 13 and including a first intermediation gear 19 engaged with the power generation driving gear 15 and a second intermediation gear 21 engaged with the power generation driven gear 17, such that the generator G may generate electricity by the power from the engine.

The electricity generated by the generator G as described above may be stored in a battery and be then supplied to the motor M.

Figure 2:
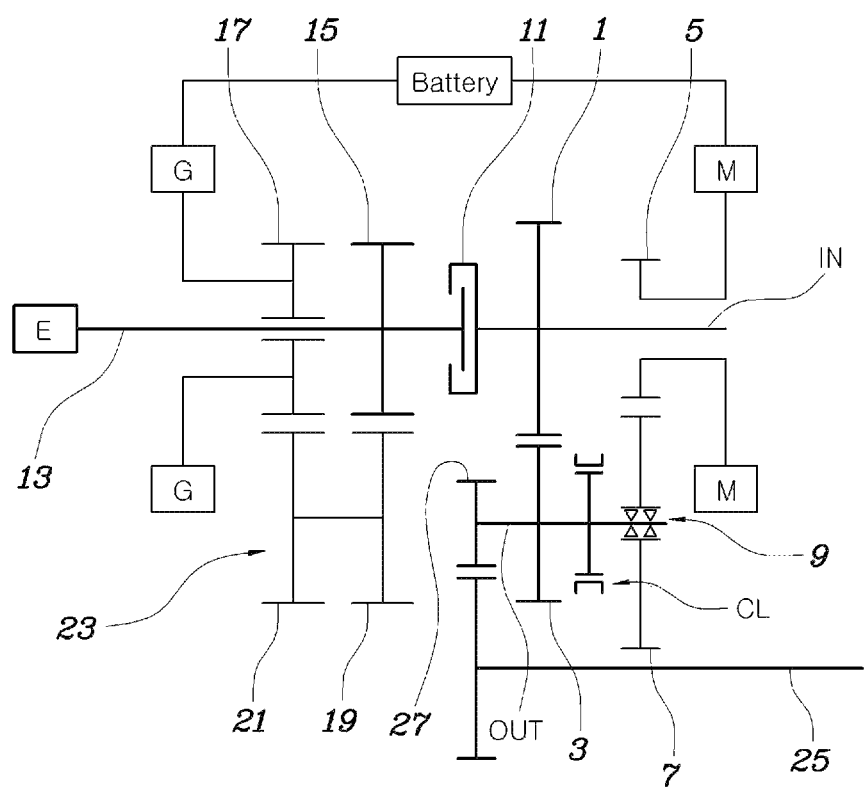
FIG. 2 is a diagram for describing the state in which the hybrid power train for a vehicle of FIG. 1 is driven in an engine mode.

FIG. 2 is a diagram showing the state in which the hybrid power train for a vehicle according to various embodiments of the present invention implements the engine mode. In FIG. 2, the power from the engine is taken off through the engine side driving gear 1, the engine side driven gear 3, and the output shaft OUT via the engine clutch 11 and the input shaft IN, and the rotational force from the engine E is not transferred to the motor side driven gear 7, the motor side driving gear 5, and the motor M by the one-way clutch 9. That is, since a drag is not present, fuel efficiency of the engine is improved.

For reference, although the case in which an output gear 27 is provided at the output shaft OUT and a separate new power taking off shaft 25 is connected to the output gear 27 has been shown in FIG. 2, this is only for convenience. That is, a differential, or the like, instead of the power taking off shaft 25 may be connected to the output gear.

Figure 3:
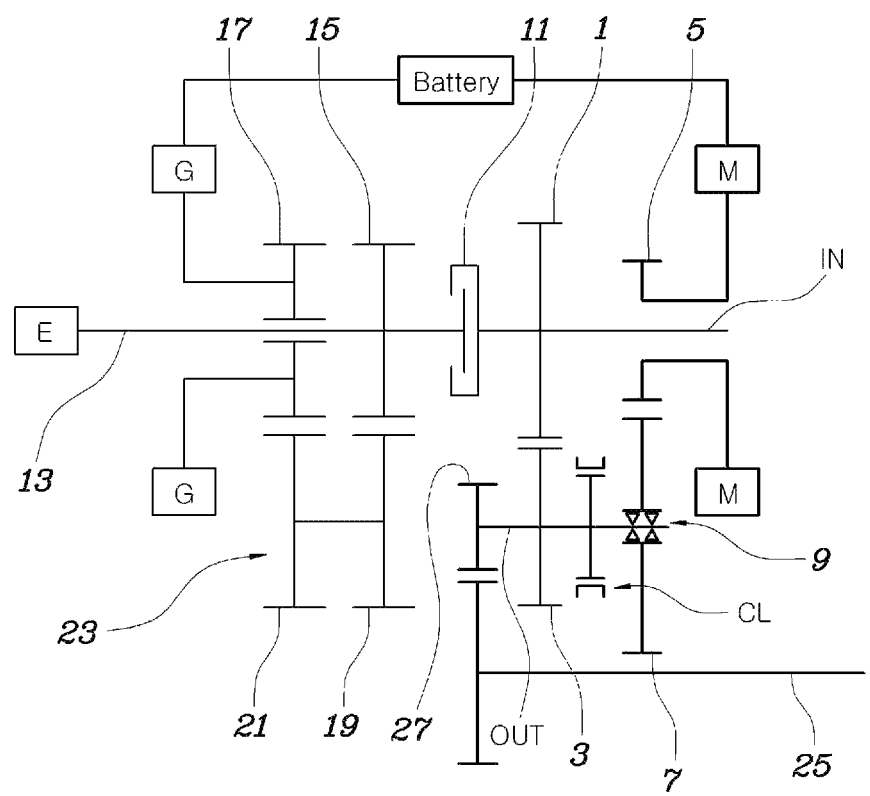
FIG. 3 is a diagram for describing the state in which the hybrid power train for a vehicle of FIG. 1 is driven in an EV mode.

FIG. 3 is a diagram showing the state in which the hybrid power train for a vehicle according to various embodiments of the present invention implements the EV mode in which the vehicle is driven only by the motor M. In FIG. 3, since the one-way clutch 9 is configured to transfer power from the motor side driven gear 7 to the output shaft OUT, the driving force from the motor is transferred to the output shaft OUT even in the state in which the clutch unit CL is not connected, similar to the engine mode, such that the vehicle may be driven in the EV mode.

However, in the case in which backward movement of the vehicle is implemented by the power from the motor M, since the motor is reversely rotated, the clutch unit CL needs to be connected in order to prepare for the case in which the power is not transferred to the output shaft OUT by the one-way clutch 9.

Figure 4:
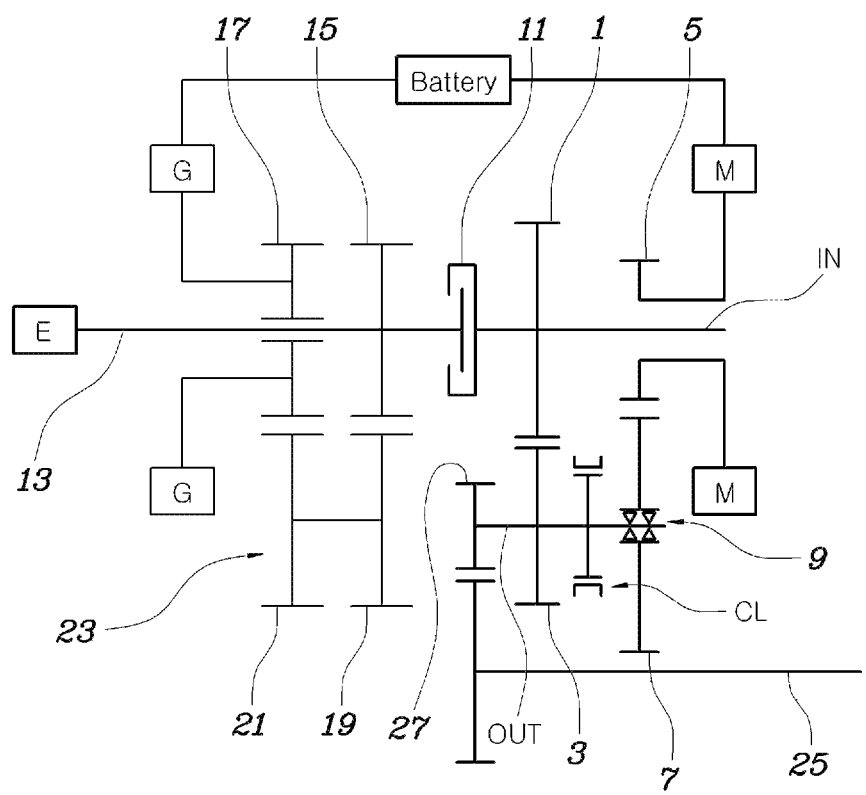
FIG. 4 is a diagram showing the state in which the hybrid power train for a vehicle of FIG. 1 is driven in a hybrid mode.

FIG. 4 is a diagram showing a hybrid mode, that is, the case in which both of the engine E and the motor M are driven. In FIG. 4, the power from the engine through the engine side driving gear 1 and the engine side driven gear 3 and the power from the motor through the motor side driving gear 5, the motor side driven gear 7, and the one-way clutch 9 are combined with each other via the engine clutch 11 and are then output at the output shaft OUT, thereby making it possible to prepare for high load driving of the vehicle.

Figure 5:
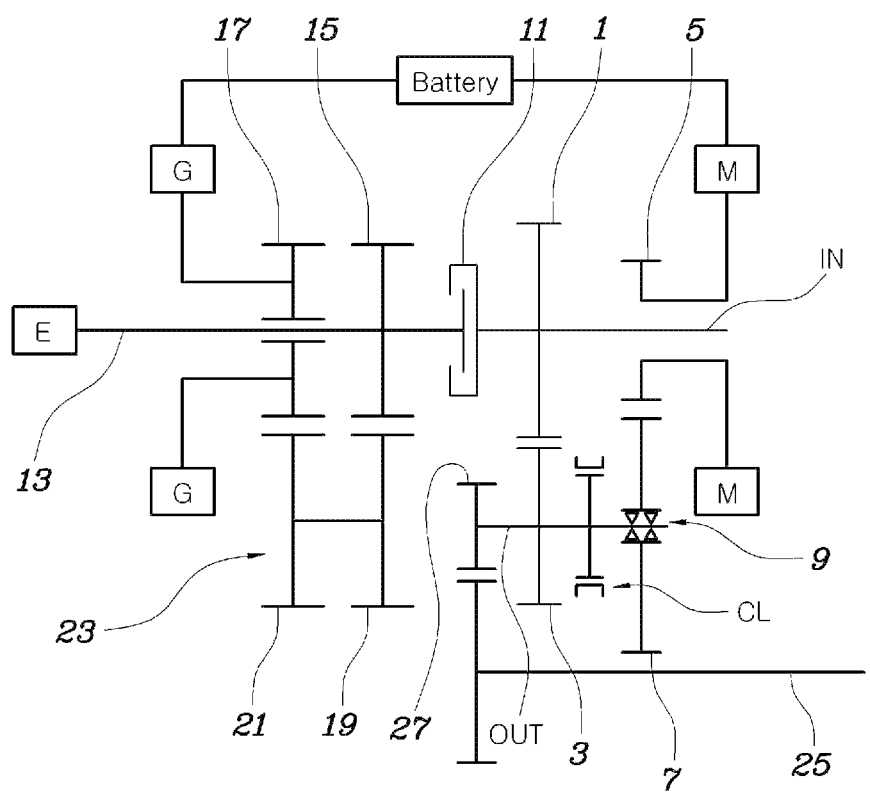
FIG. 5 is a diagram showing the state in which the hybrid power train for a vehicle of FIG. 1 is driven in a series mode.

FIG. 5 is a diagram showing a series mode, that is, the situation in which both of the engine E and the motor M are driven in the state in which the engine clutch 11 is released. In FIG. 5, the electricity generated by driving the generator G by the power from the engine is supplied to the battery and the motor is driven by the electricity from the battery to drive the vehicle, thereby making it possible to implement the series mode in which the engine provides the power only for generating power and the motor provides the power only for driving the vehicle.

For reference, portions represented by a relatively thick line in FIGS. 2 to 5 indicate portions through which the power flows.

According to various embodiments of the present invention, it is possible to improve fuel efficiency of the vehicle by preventing a motor from being driven by power of an engine for a period in which the vehicle is driven by the engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid power train for a vehicle, comprising:
    an input shaft selectively receiving power of an engine;
    an engine side driving gear provided at the input shaft;
    an output shaft disposed parallel to the input shaft;
    an engine side driven gear provided at the output shaft so as to be engaged with the engine side driving gear;
    a motor side driving gear installed to be rotated by a motor and separated from the input shaft to be rotatable independently from the input shaft while forming a concentric axis with the input shaft;
    a motor side driven gear rotatably provided at the output shaft so as to be engaged with the motor side driving gear;
    a clutch unit installed to switch a state in which the motor side driven gear is fixed to the output shaft; and
    a one-way clutch interposed between the motor side driven gear and the output shaft and allowing power to be transferred from the motor side driven gear to the output shaft in only one direction at the time of forward rotation.

2. The hybrid power train for the vehicle according to claim 1, wherein the clutch unit is formed of a dog clutch configured to switch states in which the motor side driven gear is fixed to the output shaft and is released from the output shaft.

3. The hybrid power train for the vehicle according to claim 1, wherein the clutch unit is formed of a synchronizing device configured to switch states in which the motor side driven gear is fixed to the output shaft and is released from the output shaft.

4. The hybrid power train for the vehicle according to claim 1, wherein the engine side driving gear has a diameter larger than that of the engine side driven gear, and
    the motor side driving gear has a diameter smaller than that of the motor side driven gear.

5. The hybrid power train for the vehicle according to claim 1, further comprising an engine clutch provided between the input shaft and an engine shaft of the engine so as to intermit power to the input shaft.

6. The hybrid power train for the vehicle according to claim 5, further comprising:
    a power generation driving gear provided at the engine shaft;
    a power generation driven gear rotatably installed while forming a concentric axis with the engine shaft and connected to a generator so as to rotate the generator; and
    an idler shaft disposed parallel to the engine shaft and including a first intermediation gear engaged with the power generation driving gear and a second intermediation gear engaged with the power generation driven gear.

7. A hybrid power train for a vehicle, comprising:
    an input shaft selectively receiving power of an engine;
    an engine side driving gear provided at the input shaft;
    an output shaft disposed parallel to the input shaft;
    an engine side driven gear provided at the output shaft so as to be engaged with the engine side driving gear;
    a motor side driving gear installed to be rotated by a motor and separated from the input shaft to be rotatable independently from the input shaft while forming a concentric axis with the input shaft;
    a motor side driven gear rotatably provided at the output shaft so as to be engaged with the motor side driving gear;
    a clutch unit installed to switch a state in which the motor side driven gear is fixed to the output shaft;
    an engine clutch provided between the input shaft and an engine shaft of the engine so as to intermit power to the input shaft;
    a power generation driving gear provided at the engine shaft;
    a power generation driven gear rotatably installed while forming a concentric axis with the engine shaft and connected to a generator so as to rotate the generator; and
    an idler shaft disposed parallel to the engine shaft and including a first intermediation gear engaged with the power generation driving gear and a second intermediation gear engaged with the power generation driven gear.

* * * * *